US009199513B2

(12) United States Patent
Kubota (10) Patent No.: US 9,199,513 B2
(45) Date of Patent: Dec. 1, 2015

(54) PNEUMATIC TIRE WITH TREAD HAVING DIFFERENT CURVATURE RADII

(75) Inventor: Masataka Kubota, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 1078 days.

(21) Appl. No.: 13/276,945

(22) Filed: Oct. 19, 2011

(65) Prior Publication Data

US 2012/0103488 A1    May 3, 2012

(30) Foreign Application Priority Data

Oct. 28, 2010  (JP) .................. 2010-242367

(51) Int. Cl.
*B60C 11/00* (2006.01)
*B60C 11/03* (2006.01)

(52) U.S. Cl.
CPC ......... B60C 11/0083 (2013.04); *B60C 11/0306* (2013.04)

(58) Field of Classification Search
CPC .................................... B60C 11/0083
USPC .......................... 152/209.14, 454
See application file for complete search history.

(56) References Cited

U.S. PATENT DOCUMENTS

| | | | | |
|---|---|---|---|---|
| 5,803,998 | A | * | 9/1998 | Ohsawa et al. .............. 152/454 |
| 2005/0006018 | A1 | * | 1/2005 | Maruoka et al. ......... 152/209.14 |
| 2006/0096690 | A1 | * | 5/2006 | Nakata ........................ 152/560 |
| 2010/0065174 | A1 | * | 3/2010 | Matsunaga et al. ...... 152/209.14 |

FOREIGN PATENT DOCUMENTS

| | | | | |
|---|---|---|---|---|
| JP | 60-148702 | A | * | 8/1985 |
| JP | H06-048117 | | | 2/1994 |
| JP | 06-297913 | A | * | 10/1994 |
| JP | H06-297913 | A | | 10/1994 |
| JP | H07-061214 | A | | 3/1995 |
| JP | H07-172108 | | | 7/1995 |
| JP | 2000-006616 | | | 1/2000 |
| JP | 2001-260611 | A | * | 9/2001 |
| JP | 2005-219537 | A | * | 8/2005 |
| JP | 2006-264595 | | | 10/2006 |
| JP | 2008-307948 | | | 12/2008 |
| JP | 2009-006983 | | | 1/2009 |
| JP | 2010-126103 | | | 6/2010 |
| WO | WO 2006/134776 | | | 12/2006 |

OTHER PUBLICATIONS

Machine translation for Japan 2005-219537 (no date).*
Machine translation for Japan 2001-260611 (no date).*
Machine translation for Japan 06-297913 (no date).*

* cited by examiner

*Primary Examiner* — Steven D Maki
(74) *Attorney, Agent, or Firm* — Thorpe North & Western (57) ABSTRACT

An intersection of an extended line of a shoulder side arc and an extended line of a side portion arc is a reference point P, an aspect ratio is $\beta$, and an angle $\theta$ formed by a straight line A joining the reference point P and a center crown CC and a straight line B in a tire width direction that passes through the center crown CC is configured such that $0.025 \times \beta + 1.0 \le \theta \le 0.045 \times \beta + 2.5$. A curvature radius Rc of a center portion arc and a curvature radius Rs of the shoulder side arc are configured such that $12 \le Rc/Rs \le 30$. A reference developed width L from a tire equatorial plane CL to an edge of the shoulder side arc on a tire width direction inner side and a developed tread width TDW are configured such that $0.2 \le L/(TDW/2) \le 0.7$.

7 Claims, 8 Drawing Sheets

|  |  | Conventional Example 1 | Conventional Example 2 | Working Example 1 | Working Example 2 | Working Example 3 | Working Example 4 | Comparative Example 1 | Comparative Example 2 |
|---|---|---|---|---|---|---|---|---|---|
| Inner pressure | | 230 | 300 | 300 | 300 | 300 | 300 | 300 | 300 |
| Profile | θ | 3.00 | 3.00 | 2.50 | 3.00 | 4.50 | 4.80 | 2.00 | 5.50 |
| | Rc/Rs | 6.00 | 6.00 | 20.00 | 20.00 | 20.00 | 20.00 | 20.00 | 20.00 |
| | L/(TDW/2) | 0.55 | 0.55 | 0.45 | 0.45 | 0.45 | 0.45 | 0.45 | 0.45 |
| TDW/SW | | 0.91 | 0.91 | 0.76 | 0.76 | 0.76 | 0.76 | 0.76 | 0.76 |
| SHR | | 30 | 30 | 36 | 36 | 36 | 36 | 36 | 36 |
| Tire Performance | Center wear | 110 | 100 | 115 | 114 | 110 | 108 | 115 | 101 |
| | Shoulder wear | 95 | 100 | 105 | 107 | 111 | 112 | 99 | 112 |
| | Rolling resistance | 85 | 100 | 108 | 110 | 110 | 108 | 107 | 107 |

FIG. 3

| | | Conventional Example 1 | Conventional Example 2 | Working Example 5 | Working Example 6 | Working Example 7 | Working Example 8 | Comparative Example 3 | Comparative Example 4 |
|---|---|---|---|---|---|---|---|---|---|
| Inner pressure | | 230 | 300 | 300 | 300 | 300 | 300 | 300 | 300 |
| Profile | θ | 3.00 | 3.00 | 3.30 | 3.30 | 3.30 | 3.30 | 3.30 | 3.30 |
| | Rc/Rs | 6.00 | 6.00 | 12.00 | 18.00 | 23.00 | 28.00 | 6.00 | 32.00 |
| | L/(TDW/2) | 0.55 | 0.55 | 0.45 | 0.45 | 0.45 | 0.45 | 0.45 | 0.45 |
| TDW/SW | | 0.91 | 0.91 | 0.76 | 0.76 | 0.76 | 0.76 | 0.76 | 0.76 |
| SHR | | 30 | 30 | 36 | 36 | 36 | 36 | 36 | 36 |
| Tire Performance | Center wear | 110 | 100 | 110 | 113 | 114 | 111 | 101 | 108 |
| | Shoulder wear | 95 | 100 | 103 | 106 | 108 | 105 | 98 | 103 |
| | Rolling resistance | 85 | 100 | 108 | 110 | 110 | 108 | 107 | 107 |

FIG. 4

|  |  | Conventional Example 1 | Conventional Example 2 | Working Example 9 | Working Example 10 | Working Example 11 | Working Example 12 | Comparative Example 5 | Comparative Example 6 |
|---|---|---|---|---|---|---|---|---|---|
| Inner pressure |  | 230 | 300 | 300 | 300 | 300 | 300 | 300 | 300 |
| Profile | θ | 3.00 | 3.00 | 3.30 | 3.30 | 3.30 | 3.30 | 3.30 | 3.30 |
|  | Rc/Rs | 6.00 | 6.00 | 20.00 | 20.00 | 20.00 | 20.00 | 20.00 | 20.00 |
|  | L/(TDW/2) | 0.55 | 0.55 | 0.25 | 0.42 | 0.48 | 0.57 | 0.15 | 0.75 |
| TDW/SW |  | 0.91 | 0.91 | 0.76 | 0.76 | 0.76 | 0.76 | 0.76 | 0.76 |
| SHR |  | 30 | 30 | 36 | 36 | 36 | 36 | 36 | 36 |
| Tire Performance | Center wear | 110 | 100 | 114 | 114 | 113 | 111 | 114 | 108 |
|  | Shoulder wear | 95 | 100 | 103 | 107 | 108 | 103 | 98 | 95 |
|  | Rolling resistance | 85 | 100 | 108 | 110 | 110 | 108 | 107 | 107 |

FIG. 5

|  |  | Conventional Example 3 | Conventional Example 4 | Working Example 13 | Working Example 14 | Working Example 15 | Working Example 16 | Comparative Example 7 | Comparative Example 8 |
|---|---|---|---|---|---|---|---|---|---|
| Inner pressure | | 230 | 300 | 300 | 300 | 300 | 300 | 300 | 300 |
| Profile | θ | 3.00 | 3.00 | 2.00 | 2.50 | 3.50 | 3.90 | 1.50 | 4.50 |
| | Rc/Rs | 6.00 | 6.00 | 20.00 | 20.00 | 20.00 | 20.00 | 20.00 | 20.00 |
| | L/(TDW/2) | 0.55 | 0.55 | 0.45 | 0.45 | 0.45 | 0.45 | 0.45 | 0.45 |
| TDW/SW | | 0.91 | 0.91 | 0.76 | 0.76 | 0.76 | 0.76 | 0.76 | 0.76 |
| SHR | | 30 | 30 | 36 | 36 | 36 | 36 | 36 | 36 |
| Tire Performance | Center wear | 110 | 100 | 115 | 114 | 110 | 108 | 115 | 101 |
| | Shoulder wear | 95 | 100 | 105 | 107 | 111 | 112 | 99 | 112 |
| | Rolling resistance | 85 | 100 | 108 | 110 | 110 | 108 | 107 | 107 |

FIG. 6

| | | Conventional Example 1 | Conventional Example 2 | Working Example 17 | Working Example 18 | Working Example 19 | Working Example 20 | Working Example 21 | Working Example 22 |
|---|---|---|---|---|---|---|---|---|---|
| Inner pressure | | 230 | 300 | 300 | 300 | 300 | 300 | 300 | 300 |
| Profile | θ | 3.00 | 3.00 | 3.30 | 3.30 | 3.30 | 3.30 | 3.30 | 3.30 |
| | Rc/Rs | 6.00 | 6.00 | 20.00 | 20.00 | 20.00 | 20.00 | 20.00 | 20.00 |
| | L/(TDW/2) | 0.55 | 0.55 | 0.45 | 0.45 | 0.45 | 0.45 | 0.45 | 0.45 |
| TDW/SW | | 0.91 | 0.91 | 0.67 | 0.73 | 0.78 | 0.83 | 0.60 | 0.90 |
| SHR | | 30 | 30 | 36 | 36 | 36 | 36 | 36 | 36 |
| Tire Performance | Center wear | 110 | 100 | 112 | 113 | 114 | 114 | 110 | 114 |
| | Shoulder wear | 95 | 100 | 103 | 106 | 108 | 109 | 101 | 110 |
| | Rolling resistance | 85 | 100 | 108 | 110 | 108 | 106 | 108 | 103 |

FIG. 7

|  |  | Conventional Example 1 | Conventional Example 2 | Working Example 23 | Working Example 24 | Working Example 25 | Working Example 26 | Working Example 27 | Working Example 28 |
|---|---|---|---|---|---|---|---|---|---|
| Inner pressure | | 230 | 300 | 300 | 300 | 300 | 300 | 300 | 300 |
| Profile | θ | 3.00 | 3.00 | 3.30 | 3.30 | 3.30 | 3.30 | 3.30 | 3.30 |
| | Rc/Rs | 6.00 | 6.00 | 20.00 | 20.00 | 20.00 | 20.00 | 20.00 | 20.00 |
| | L/(TDW/2) | 0.55 | 0.55 | 0.45 | 0.45 | 0.45 | 0.45 | 0.45 | 0.45 |
| TDW/SW | | 0.91 | 0.91 | 0.76 | 0.76 | 0.76 | 0.76 | 0.76 | 0.76 |
| SHR | | 30 | 30 | 33 | 35 | 39 | 42 | 28 | 47 |
| Tire Performance | Center wear | 110 | 100 | 114 | 114 | 113 | 113 | 114 | 109 |
| | Shoulder wear | 95 | 100 | 105 | 107 | 109 | 107 | 101 | 106 |
| | Rolling resistance | 85 | 100 | 108 | 110 | 110 | 108 | 107 | 107 |

FIG. 8

US 9,199,513 B2

PNEUMATIC TIRE WITH TREAD HAVING DIFFERENT CURVATURE RADII

PRIORITY CLAIM

Priority is claimed to Japan Patent Application Serial No. 2010-242367 filed on Oct. 28, 2010.

BACKGROUND

1. Technical Field

The present technology relates to a pneumatic tire, and particularly relates to a pneumatic tire in which, when applied air pressure is increased to reduce rolling resistance for the purpose of improving fuel efficiency, wear in a center region and worsening of dry braking ability caused by an increase in ground contact pressure that accompanies an increase in radial growth of the center region are improved.

2. Related Art

Conventionally, pneumatic tires are known in which a curvature of a profile along a tire width direction of a tread surface is close to a straight line (e.g. see Japanese Unexamined Patent Application Publication No. 2008-307948). Such a pneumatic tire has a plurality of arcs having different curvature radii in a tread surface, including at least a center portion arc positioned in a center in the tire width direction and a shoulder side arc positioned outermost in the tire width direction. When a cross-section in a tire meridian direction is viewed in a state where the pneumatic tire is assembled on a regular rim and is inflated to an inner pressure that is 5% of a regular inner pressure; an intersection of an imaginary extended line that is parallel to a tire radial direction and extends from a position outermost in the width direction toward an outer circumferential side in the tire radial direction of a belt layer and a profile of the tread surface is a reference point; an intersection of a tire equatorial plane and the profile of the tread surface is a center crown; an angle formed by a line joining the reference point and the center crown and a line parallel to the tire width direction is θ; a curvature radius of a center portion arc is Rc; a curvature radius of a shoulder side arc is Rs; a reference developed width that is an arc length from the tire equatorial plane to a position at an edge of the shoulder side arc on the tire width direction inner side is L; and a developed tread width that is an arc length of the tread surface in the tire width direction is TDW, the tread surface is formed so as to satisfy $1° < θ < 4.5°$, $5 < Rc/Rs < 10$, and $0.4 < L/(TDW/2) < 0.7$.

In recent years, research has been conducted into increasing applied air pressure to reduce rolling resistance of a pneumatic tire for the purpose of improving the fuel efficiency of a vehicle on which the pneumatic tire is mounted. However, increasing the applied air pressure leads to an increase in radial growth of a center region (center in the tire width direction). An increase in ground contact pressure of the center region accompanies the increase in radial growth thereof, which results in the center region of the tread surface becoming prone to wear.

With the pneumatic tire described in Japanese Unexamined Patent Application Publication No. 2008-307948, wear in the center region of the tread surface tends to be improved by making a curvature of the profile along the tire width direction of the tread surface close to a straight line. However, when the pneumatic tire described in Japanese Unexamined Patent Application Publication No. 2008-307948 is highly pressurized, unevenness of wear of the pneumatic tire cannot be sufficiently suppressed. Moreover, depending on the shape thereof, rolling resistance of the pneumatic tire cannot be appropriately reduced.

SUMMARY

The present technology provides a pneumatic tire in which rolling resistance is reduced and wear resistance of the center region in the tread surface and wear resistance of the shoulder region can be enhanced.

A pneumatic tire of the present technology includes a plurality of arcs having different curvature radii in a tread surface of a tread portion, including at least a center portion arc positioned in a center in a tire width direction and a shoulder side arc connected to an outer side in the tire width direction of the center portion arc. When a cross-section in a tire meridian direction is viewed in a state where the pneumatic tire is assembled on a regular rim and is inflated to an inner pressure that is 5% of a regular inner pressure; an intersection of an imaginary extended line of the shoulder side arc and an imaginary extended line of a side portion arc on an outermost side in the tire width direction in the tread portion is a reference point; an intersection of a tire equatorial plane and a profile of the tread surface is a center crown; an angle formed by a straight line joining the reference point and the center crown and a straight line parallel to the tire width direction and passing through the center crown is θ; a curvature radius of a center portion arc is Rc; a curvature radius of a shoulder side arc is Rs; a reference developed width that is an arc length from the tire equatorial plane to a position at an edge of the shoulder side arc on the tire width direction inner side is L; a developed tread width that is an arc length in the tire width direction between points where a reference line that passes through the reference point and is parallel to the tire equatorial plane intersects the tread surface is TDW; and when an aspect ratio is β, the tread surface is formed so as to satisfy $0.025×β+1.0 ≤ θ ≤ 0.045×β+2.5$, $12 ≤ Rc/Rs ≤ 30$, and $0.2 ≤ L/(TDW/2) ≤ 0.7$.

According to this pneumatic tire, an amount of depression toward the tire radial direction inner side from the center portion arc to the shoulder side arc is reduced due to configuring an angle θ formed by a straight line joining the reference point and the center crown and a straight line parallel to the tire width direction and passing through the center crown to be in a range $0.025×β+1.0 ≤ θ ≤ 0.045×β+2.5$. Furthermore, the arc of the tread surface from the center portion arc to the shoulder side arc is made closer to a straight line by configuring a relationship between a curvature radius Rc of the center portion arc and a curvature radius Rs of the shoulder side arc to be $12 ≤ Rc/Rs ≤ 30$, and configuring a relationship between a reference developed width L that is an arc length of the center portion arc from the tire equatorial plane to a position at an edge of the shoulder side arc on the tire width direction inner side and a developed tread width TDW to be $0.2 ≤ L/(TDW/2) ≤ 0.7$. Therefore, radial growth of the center portion arc is suppressed and, as a result, wear of the shoulder region and wear of the center region of the tread surface can be improved. More specifically, wear of the center region can be improved while worsening of wear of the shoulder region is suppressed.

Additionally, when a tire cross-sectional width that is a length at a position of greatest width in the tire width direction is SW, a profile of the pneumatic tire of the present technology is formed so as to satisfy $0.65 ≤ TDW/SW ≤ 0.85$.

Shoulder wear can be more preferably suppressed by configuring TDW/SW to be not less than 0.65. Additionally, rolling resistance can be further reduced by configuring TDW/SW to be not more than 0.85. Therefore, according to this pneumatic tire, rolling resistance can be reduced, and prominent enhancements in wear resistance of the center region of the tread surface and wear resistance of the shoulder region can be obtained.

Additionally, with the pneumatic tire of the present technology, a curvature radius SHR of a shoulder portion arc having a first edge in contact with the shoulder side arc and a second edge in contact with the side portion arc on the outermost side in the tire width direction of the tread portion is formed so as to satisfy 32≤SHR≤45.

Shoulder wear can be more preferably suppressed by configuring the curvature radius SHR to be not less than 32 and center wear can be preferably suppressed by configuring the curvature radius SHR to be not more than 45. Therefore, according to this pneumatic tire, rolling resistance can be reduced, and prominent enhancements in wear resistance of the center region of the tread surface and wear resistance of the shoulder region can be obtained.

Additionally, the pneumatic tire is applied to a high internal-pressure pneumatic tire for use on a passenger car.

Applied air pressure is preferably increased to reduce rolling resistance in order to improve fuel efficiency. Thus, according to this pneumatic tire, by application to a high internal-pressure pneumatic tire for use on a passenger car, rolling resistance can be reduced, and prominent enhancements in wear resistance of the center region of the tread surface and wear resistance of the shoulder region can be obtained.

With the pneumatic tire according to the present technology, a pneumatic tire can be provided in which rolling resistance is reduced and wear resistance of the center region in the tread surface and wear resistance of the shoulder region can be enhanced.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

Figure 1:
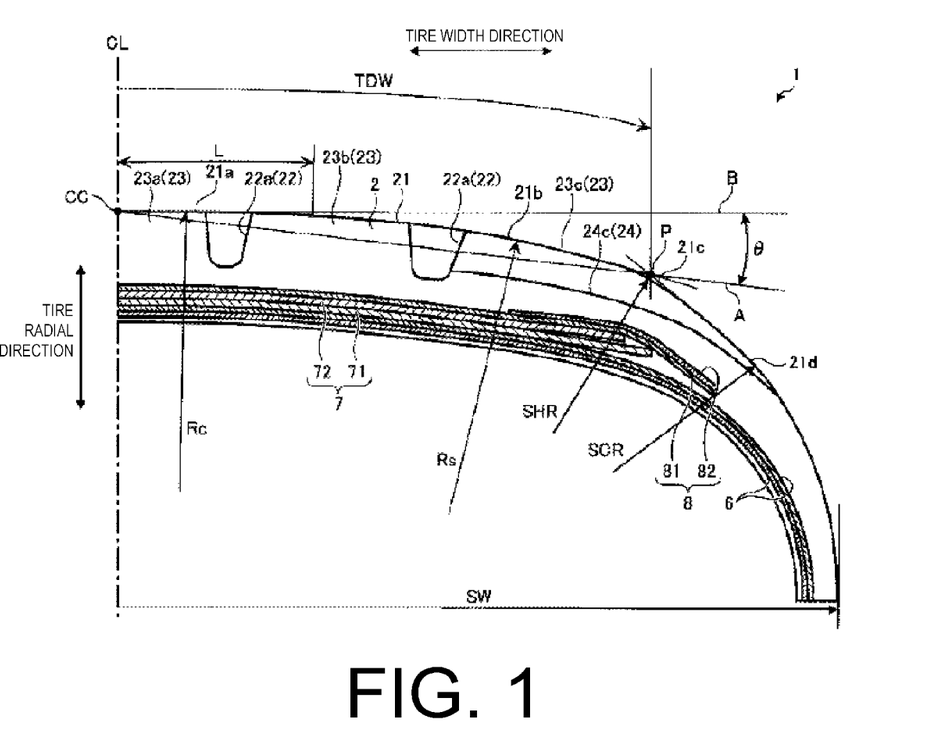
FIG. 1 is a partial cutout meridian cross-sectional view of a pneumatic tire according to an embodiment of the present technology.
Figure 2:
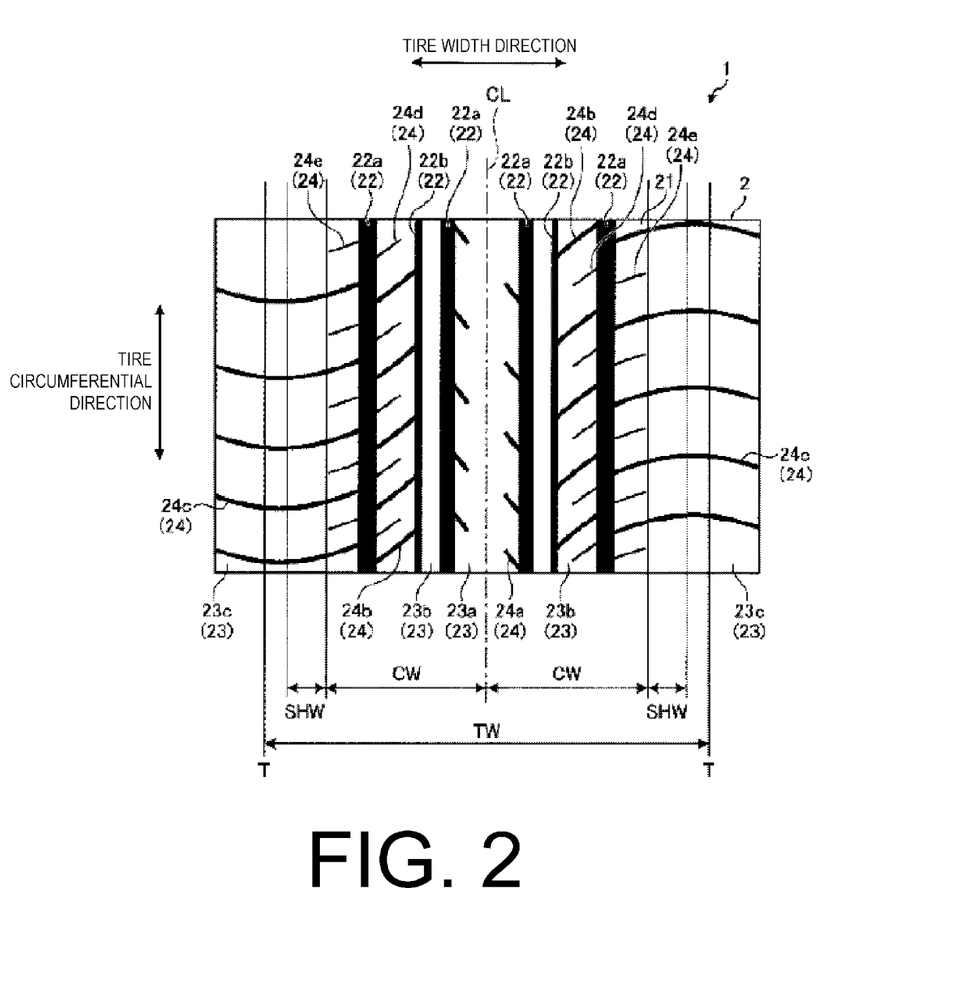
FIG. 2 is a partial plan view of a tread surface of the pneumatic tire according to the embodiment of the present technology.

FIG. 1 is a partial cutout meridian cross-sectional view of a pneumatic tire according to an embodiment of the present technology. FIG. 2 is a partial plan view of a tread surface of the pneumatic tire according to the embodiment of the present technology.

In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the circumferential direction of the pneumatic tire 1 that lies on the tire equatorial plane CL. In this embodiment, "tire equator line" is given the same "CL" reference symbol as that used for the tire equatorial plane. In addition, the pneumatic tire 1 described below is constructed to be essentially symmetric around the tire equatorial plane CL, and therefore, as illustrated in the meridian cross-sectional view (FIG. 1) where the pneumatic tire 1 is cut at a plane passing through a rotational axis of the pneumatic tire 1, only one side (the right side in FIG. 1) centered on the tire equatorial plane CL is illustrated in the drawing, and only this one side is described. A description of the other side (left side in FIG. 1) is omitted.

As illustrated in FIG. 1, the pneumatic tire 1 of this embodiment has a tread portion 2. The tread portion 2 is formed from a rubber material (tread rubber), is exposed on the outermost side in the tire radial direction of the pneumatic tire 1, and a surface thereof constitutes a profile of the pneumatic tire 1. The surface of the tread portion 2 is formed as a tread surface 21, which is a surface that contacts a road surface when a vehicle (not shown in the drawings) upon which the pneumatic tire 1 is mounted is traveling.

Land portions are formed by a plurality of grooves on the tread surface 21. An example thereof is one in which, as illustrated in FIGS. 1 and 2, in the pneumatic tire 1 according to this embodiment, a plurality of vertical grooves 22 extending along the tire circumferential direction is provided in the tread surface 21. The vertical grooves 22 of this embodiment include four circumferential main grooves 22a and two circumferential narrow grooves 22b provided in the tread surface 21. Moreover, a plurality of rib-like land portions 23 extending along the tire circumferential direction and parallel with the tire equator line CL is formed in the tread surface 21 by the plurality of circumferential main grooves 22a. Five rows of the land portions 23 of this embodiment are provided in the tread surface 21 having the circumferential main grooves 22a as boundaries. The land portions 23 include a first land portion 23a disposed on the tire equator line CL, a second land portion 23b disposed on an outer side in the tire width direction of the first land portion 23a, and a third land portion 23c disposed on the outer side in the tire width direction of the second land portion 23b, which is an outermost side in the tire width direction of the tread surface 21. The circumferential narrow grooves 22b are provided in the second land portion 23b.

Additionally, lateral grooves 24 that intersect with the vertical grooves 22 are provided in each of the land portions 23 (23a, 23b, and 23c) in the tread surface 21. The lateral grooves 24 provided in the first land portion 23a have a first end open to the circumferential main grooves 22a and a second closed end, and are formed as protruding grooves 24a that are inclined in the tire width direction and the tire circumferential direction. The protruding grooves 24a, with the tire equator line CL as a boundary, are formed so as to incline in opposite directions from the circumferential main grooves 22a.

Additionally, the lateral grooves 24 provided in the second land portion 23b have a first end open to the circumferential main grooves 22a on the outer side in the tire width direction and a second end open to the circumferential narrow grooves 22b, and are formed as angled grooves 24b that curve while inclining in the tire width direction and the tire circumferential direction. These angled grooves 24b are formed so as to incline in opposite directions from the circumferential main grooves 22a, having the tire equator line CL as a boundary.

Additionally, the lateral grooves 24 provided in the third land portion 23c are formed as arcuate grooves 24c that curve while extending from an outermost edge in the tire width direction of the tread surface 21 to a tire width direction inner side, an extending end thereof being open to the circumferential main grooves 22a. The arcuate grooves 24c are formed so as to curve in opposite directions, having the tire equator line CL as a boundary.

Sipes 24d and 24e that intersect the tire circumferential direction are provided in the second land portion 23b and the third land portion 23c of the tread surface 21 as the lateral grooves 24. The sipes 24d provided in the second land portion 23b have a first end open to the circumferential main grooves 22a on the outer side in the tire width direction and a second end that is closed, and are formed so as to curve while inclining in the tire width direction and the tire circumferential direction. The sipes 24d are formed so as to incline in opposite directions from the circumferential main grooves 22a, having the tire equator line CL as a boundary. Additionally, the sipes 24e provided in the third land portion 23c have a first end open to the circumferential main grooves 22a on the outer side in the tire width direction and a second end that is closed, and are formed so as to curve while inclining in the tire width direction and the tire circumferential direction. The sipes 24e are formed so as to incline in opposite directions from the circumferential main grooves 22a, having the tire equator line CL as a boundary.

Here, the circumferential main grooves 22a are grooves extending in the tire circumferential direction that have a groove width of not less than 4 mm. Additionally, the circumferential narrow grooves 22b are grooves extending in the tire circumferential direction that have a groove width of less than 4 mm. Moreover, sipes 24d and 24e are grooves crossing the tire circumferential direction that have a groove width of not more than 1 mm. The protruding grooves 24a, the angled grooves 24b, and the arcuate grooves 24c are collectively referred to as "lug grooves", and are grooves crossing the tire circumferential direction that have a groove width greater than 1 mm except the sipes 24d and 24e. Note that the configuration of the grooves and the land portions is not limited to the example described above, and various configurations are possible depending on the disposal of the vertical grooves 22 and the lateral grooves 24. Additionally, while not illustrated in the drawings, the tread surface 21 may not include the vertical grooves 22, and may have a configuration where only lateral grooves 24 that bend or curve in the tire width direction are provided.

Additionally, the pneumatic tire 1 according to this embodiment includes a carcass layer 6, a belt layer 7, and a belt reinforcing layer 8.

Ends of the carcass layer 6 in the tire width direction are folded over a pair of bead cores (not illustrated) from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having an angle of 90 degrees (±5 degrees) with respect to the tire circumferential direction, and covered by a coating rubber. The carcass cords are formed from organic fibers (e.g. polyester, rayon, nylon, or the like). As illustrated in FIG. 1, in this embodiment, the carcass layer 6 is provided having two layers, but may be provided having at least one layer.

The belt layer 7 has a multi-layer structure where at least two layers (belts 71 and 72) are stacked. The belt layer 7 is disposed on an outer side in the tire radial direction that is the periphery of the carcass layer 6, in the tread portion 2, and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by at least two layers, reinforcing layers 81 and 82, in an aspect where the belt reinforcing layer 8 covers the periphery of the belt layer 7. The reinforcing layers 81 and 82 are constituted by a plurality of cords (not illustrated) juxtaposed in the tire width direction and parallel (±5 degrees) to the tire circumferential direction, which are covered by a coating rubber. The cords are formed from steel or organic fibers (e.g. polyester, rayon, nylon, or the like). With the belt reinforcing layer 8 illustrated in FIG. 1, the reinforcing layer 81 on the belt layer 7 side is formed to be larger than the belt layer 7 in the tire width direction and disposed so as to cover an entirety of the belt layer 7. The reinforcing layer 82 on the outer side in the tire radial direction of the reinforcing layer 81 is disposed only on an edge of the reinforcing layer 81 in the tire width direction so as to cover an edge of the belt layer 7 in the tire width direction. The configuration of the belt reinforcing layer 8 is not limited to that described above. While not illustrated in the drawings, a configuration may be used where each of the reinforcing layers 81 and 82 are formed to be larger than the belt layer 7 in the tire width direction and disposed so as to cover an entirety of the belt layer 7, or a configuration may be used where each of the reinforcing layers 81 and 82 are disposed so as to cover the edge of the belt layer 7 in the tire width direction. In other words, it is sufficient that the belt reinforcing layer 8 overlap with at least the edge of the belt layer 7 in the tire width direction. Additionally, the belt reinforcing layer 8 (reinforcing layers 81 and 82) is provided by winding a band-like (e.g. with a width of 10 mm) strip material in the tire circumferential direction.

In the pneumatic tire 1 configured as described above, the profile of the tread surface 21 (the surface of the tread portion 2) is formed from a plurality of arcs, having different curvature radii, which is convex toward the outer side in the tire radial direction. Specifically, as illustrated in FIG. 1, the tread surface 21 is constituted by a center portion arc 21a, a shoulder side arc 21b, a shoulder portion arc 21c, and a side portion arc 21d.

The center portion arc 21a is located in a center of the tread surface 21 in the tire width direction, includes the tire equatorial plane CL, and is formed on both sides in the tire width direction, centered on the tire equatorial plane CL. The center portion arc 21a is formed so that a radius in the tire radial direction of a portion including the tire equatorial plane CL is the largest. The shoulder side arc 21b is formed so as to be continuous with the outer side in the tire width direction of the center portion arc 21a. The shoulder portion arc 21c is formed so as to be continuous with the outer side in the tire width direction of the shoulder side arc 21b. The side portion arc 21d is formed so as to be continuous with the outer side in the tire width direction of the shoulder portion arc 21c, and is positioned on the outermost side in the tire width direction of the tread portion 2.

When the cross-section in a tire meridian direction illustrated in FIG. 1 is viewed in a state where the pneumatic tire 1 is assembled on a regular rim and is inflated to an inner pressure that is 5% of a regular inner pressure, an intersection of an imaginary extended line of the shoulder side arc 21b and an imaginary extended line of the side portion arc 21d is a reference point P. Additionally, an intersection of the tire equatorial plane CL and the profile of the tread surface 21 is a center crown CC; and an angle formed by a straight line A joining the reference point P and the center crown CC and a straight line B parallel to the tire width direction and passing through the center crown CC is θ. Moreover, a curvature radius of the center portion arc 21a is Rc. A curvature radius of the shoulder side arc 21b is Rs. A reference developed width that is an arc length from the tire equatorial plane CL to a position at an edge of the shoulder side arc 21b on the tire width direction inner side is L. Furthermore, a developed tread width that is an arc length in the tire width direction of the tread surface 21 is TDW. An aspect ratio is β. Note that the developed tread width TDW is a developed length of the tread surface 21 in the tire width direction between points where a reference line that passes through the reference point P and is parallel to the tire equatorial plane CL intersects the tread surface 21.

In this case, the tread surface 21 of the pneumatic tire 1 of this embodiment is formed so as to satisfy the following formulas (1) to (3).

$$0.025 \times \beta + 1.0 \leq \theta \leq 0.045 \times \beta + 2.5 \quad (1)$$

$$12 \leq Rc/Rs \leq 30 \quad (2)$$

$$0.2 \leq L/(TDW/2) \leq 0.7 \quad (3)$$

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. "Aspect ratio" refers to a ratio of cross-sectional height to cross-sectional width of a tire. "Cross-sectional width" is a width, excluding designs and characters or the like on the side surface of the tire, where the tire is assembled on a regular rim, inflated to a regular inner pressure, and in an unloaded state. "Cross-sectional height" is one-half of a difference between an outer diameter and a rim diameter, where the tire is assembled on a regular rim, inflated to a regular inner pressure, and in an unloaded state.

As illustrated in FIG. 2, a groove area ratio at a ground contact region G of the tread surface 21 is GR. Additionally, a range in the ground contact region G from the tire equatorial plane CL to a position 70% of TDW/2 to the outer side in the tire width direction is a center region GC. Additionally, a range, which is within a range in the ground contact region G from the tire equatorial plane CL to a position 90% of TDW/2 to the outer side in the tire width direction, from an edge on the outer side in the tire width direction of the center region GC toward the outer side in the tire width direction is a shoulder region GS.

The "ground contact region G" refers to a region of the tread surface 21 in the tire circumferential direction that contacts the road surface when the pneumatic tire 1 is assembled on a regular rim, inflated to a regular inner pressure (230 kPa), and loaded with 70% of a regular load. In FIG. 2, a ground contact width TW where a width of the ground contact region G in the tire width direction is greatest is illustrated. Moreover, ground contact edges T, which are both of the outermost edges of the ground contact region G in the tire width direction are also illustrated. Furthermore, in FIG. 2, a ground contact width CW where a width of the center region GC in the tire width direction is greatest is illustrated. Moreover, a ground contact width SHW, where a width of the shoulder region GS in the tire width direction is greatest is also illustrated. Note that "regular load" refers to "maximum load capacity" stipulated by JATMA, a maximum value in "tire load limits at various cold inflation pressures" defined by TRA, and "load capacity" stipulated by ETRTO.

According to the pneumatic tire 1 of this embodiment having such a configuration, an angle θ formed by the straight line A joining the reference point P and the center crown CC and the straight line B parallel to the tire width direction and passing through the center crown CC is in the range 0.025× β+1.0≤θ≤0.045×β+2.5. Therefore, compared to general pneumatic tires, the amount of depression toward the inner side in the tire radial direction from the center portion arc 21a to the shoulder side arc 21b is reduced. Furthermore, the relationship between the curvature radius Rc of the center portion arc 21a and the curvature radius Rs of the shoulder side arc 21b is configured to be 12≤Rc/Rs≤30, and the relationship between the reference developed width L that is the arc length of the center portion arc 21a from the tire equatorial plane CL to a position at an edge of the shoulder side arc 21b on the tire width direction inner side and a developed tread width TDW is configured to be 0.2≤L/(TDW/2)≤0.7. Therefore, compared to general pneumatic tires, the arc of the tread surface 21 from the center portion arc 21a to the shoulder side arc 21b is made closer to a straight line. As a result, it is possible to reduce rolling resistance because radial growth of the center portion arc 21a is suppressed, to improve wear of the center region GC (center wear) of the tread surface 21, and to improve wear of the shoulder region GS (shoulder wear).

If the angle θ is less than 0.025×β+1.0, the amount of depression from the center portion arc 21a to the shoulder side arc 21b will be excessively small, thus leading to the shoulder region GS becoming prone to wear (shoulder wear). On the other hand, if the angle θ exceeds 0.045×β+2.5, the amount of depression from the center portion arc 21a to the shoulder side arc 21b will be great, thus leading to difficulties in improving the wear of the center region GC (center wear) of the tread surface 21. By configuring the angle θ to be within the range 0.03×β+1.2≤θ≤0.04×β+2.3, the amount of depression from the center portion arc 21a to the shoulder side arc 21b can be made appropriate. As a result, shoulder wear will not occur or, rather, it is possible to obtain a prominent improvement in center wear while suppressing the worsening of the wear of the shoulder region GS of the tread surface 21 (or improving the worsening of the wear of the shoulder region GS of the tread surface 21).

If Rc/Rs is less than 10, the radial growth of the center portion arc 21a cannot be sufficiently suppressed, and it will be difficult to improve the wear of the center region GC (center wear) of the tread surface 21 due to the increase in ground contact pressure of the center region GC. On the other hand, if Rc/Rs exceeds 30, the radial growth of the center portion arc 21a will not be sufficiently suppressed, and the desired improvement of the wear of the center region GC (center wear) of the tread surface 21 will not be obtained. By configuring Rc/Rs to be within the range 15≤Rc/Rs≤25, the radial growth of the center portion arc 21a can be sufficiently suppressed, and it is possible to obtain a prominent improvement of the wear of the center region GC (center wear) of the tread surface 21 while suppressing the worsening of the wear of the shoulder region GS of the tread surface 21 (or improving the worsening of the wear of the shoulder region GS of the tread surface 21).

Additionally, if L/(TDW/2) is less than 0.2, the radial growth of the center portion arc 21a cannot be sufficiently suppressed, and it will be difficult to improve the wear of the center region GC (center wear) of the tread surface 21 due to the increase in ground contact pressure of the center region GC. On the other hand, if L/(TDW/2) exceeds 0.7, the radial growth of the center portion arc 21a will not be sufficiently suppressed, and the desired improvement of the wear of the center region GC (center wear) of the tread surface 21 will not be obtained. By configuring L/(TDW/2) to be within the range 0.4≤L/(TDW/2)≤0.5, the radial growth of the center portion arc 21a can be sufficiently suppressed, and it is possible to obtain a prominent improvement of the wear of the center region GC (center wear) of the tread surface 21 while suppressing the worsening of the wear of the shoulder region GS of the tread surface 21 (or improving the worsening of the wear of the shoulder region GS of the tread surface 21).

As a result, according to the pneumatic tire 1 of this embodiment, it is possible to reduce rolling resistance, enhance wear resistance of the center region GC (center wear resistance) of the tread surface 21, and enhance wear resistance of the shoulder region GS (shoulder wear resistance). Additionally, it is possible to reduce rolling resistance, and enhance wear resistance of the center region GC (center wear resistance) of the tread surface 21 while suppressing a decline in the wear resistance of the shoulder region GS (shoulder wear resistance).

Additionally, the pneumatic tire 1 of this embodiment is preferably applied to a high internal-pressure pneumatic tire for use on a passenger car. By applying the pneumatic tire 1 to a high internal-pressure pneumatic tire for use on a passenger car, the effects described above, specifically, high performances of rolling resistance, center wear resistance, and shoulder wear resistance can be obtained.

Applied air pressure is preferably increased to reduce rolling resistance in order to improve fuel efficiency. "High inner pressure" is defined in this embodiment as not less than 280 kPa and not more than 350 kPa in a pneumatic tire for use on a passenger car. Thus, by application to a high internal-pressure pneumatic tire for use on a passenger car, rolling resistance can be reduced, and prominent enhancements in wear resistance of the center region GC of the tread surface 21 and wear resistance of the shoulder region GS can be obtained.

Additionally, when a tire cross-sectional width that is a length at a position of greatest width in the tire width direction is SW, a profile of the pneumatic tire 1 is preferably formed so as to satisfy 0.65≤TDW/SW≤0.85. Shoulder wear can be more preferably suppressed by configuring TDW/SW to be not less than 0.65. Additionally, rolling resistance can be further reduced by configuring TDW/SW to be not more than 0.85. Note that with the pneumatic tire 1, the relationship between the developed tread width TDW and a tire cross-sectional width SW preferably satisfies 0.70≤TDW/SW≤0.80. By satisfying 0.70≤TDW/SW≤0.80, the pneumatic tire 1 can preferably obtain the effects described above.

Additionally, with the pneumatic tire 1, a curvature radius SHR of a shoulder portion arc 21c having a first edge in contact with the shoulder side arc 21b (curvature radius is arc of Rs) and a second edge in contact with the side portion arc 21d on the outermost side in the tire width direction of the tread portion 2 (curvature radius is arc of SCR) is preferably formed so as to satisfy 32≤SHR≤45. Shoulder wear can be more preferably suppressed by configuring the curvature radius SHR to be not less than 32 and center wear can be preferably suppressed by configuring the curvature radius SHR to be not more than 45. Moreover, the curvature radius SHR is more preferably configured so that 35≤SHR≤40. By configuring the curvature radius SHR so that 35≤SHR≤40, the effects described above can be further enhanced. Note that when applying the pneumatic tire 1 to a high internal-pressure pneumatic tire for use on a passenger car, by configuring the curvature radius SHR to be within the range described above, particularly preferable effects can be obtained.

EXAMPLES

In the examples, performance tests for tire performances (center wear, shoulder wear, and rolling resistance) were performed on a plurality of types of pneumatic tires under different conditions (see FIGS. 3 to 8).

Of these performance tests, in Conventional Examples 1 and 2, Working Examples 1 to 12 and 17 to 28, and Comparative Examples 1 to 6 shown in FIGS. 3 to 5, 7, and 8, a pneumatic tire having a tire size of 215/55R17 was assembled on a rim of a 17×7J aluminum wheel, inflated to an air pressure specified for each example, and mounted on a test vehicle (3 L front-engine rear-drive (FR) sedan). The pneumatic tires used in the performance tests had an aspect ratio of 55. Therefore, a range of θ was 2.375≤θ≤4.975, and a preferable range was 2.85≤θ≤4.5. Of these performance tests, in Conventional Examples 3 and 4, Working Examples 13 to 16, and Comparative Examples 7 and 8 shown in FIG. 6, a pneumatic tire having a tire size of 245/35ZR19 was assembled on a rim of a 19×81/2J aluminum wheel, inflated to an air pressure specified for each example, and mounted on a test vehicle (3 L front-engine rear-drive (FR) sedan). The pneumatic tires used in the performance tests had an aspect ratio of 35. Therefore, the range of θ was 1.875≤θ≤4.075, and the preferable range was 2.25≤θ≤3.7.

Method of evaluating center wear: An amount of remaining groove (groove depth) at a position of greatest groove depth of the center region after traveling on a dry road surface for 10,000 km was measured. Evaluations were performed by indexing the measurement results with Conventional Example 2 as the standard score (100). Larger index scores indicate superior center wear resistance.

Method of evaluating shoulder wear: An amount of remaining groove (groove depth) at a position of greatest groove depth of the shoulder region after traveling on a dry road surface for 10,000 km was measured. Evaluations were performed by indexing the measurement results with Conventional Example 2 as the standard score (100). Larger index scores indicate superior shoulder wear resistance.

Method of evaluating rolling resistance: A load of 4.2 kN was applied to the test tires described above, and rolling resistance at a speed of 80 km/h was measured using a drum rolling resistance tester with a drum diameter of 1707 mm Evaluations were performed by indexing the measurement results with Conventional Example 2 as the standard score (100). Larger index scores indicate lower rolling resistance, and are superior.

In FIGS. 3 to 8, the pneumatic tires of Conventional Examples 1 to 4 are the pneumatic tire described in Japanese Unexamined Patent Application Publication No. 2008-307948 (Japanese Unexamined Patent Application Publication No. 2008-307948A); the pneumatic tires of Conventional Examples 1 and 3 were inflated to an inner pressure of 230 kPa, and the pneumatic tires of Conventional Examples 2 and 4 were inflated to an inner pressure of 300 kPa.

Figure 3:
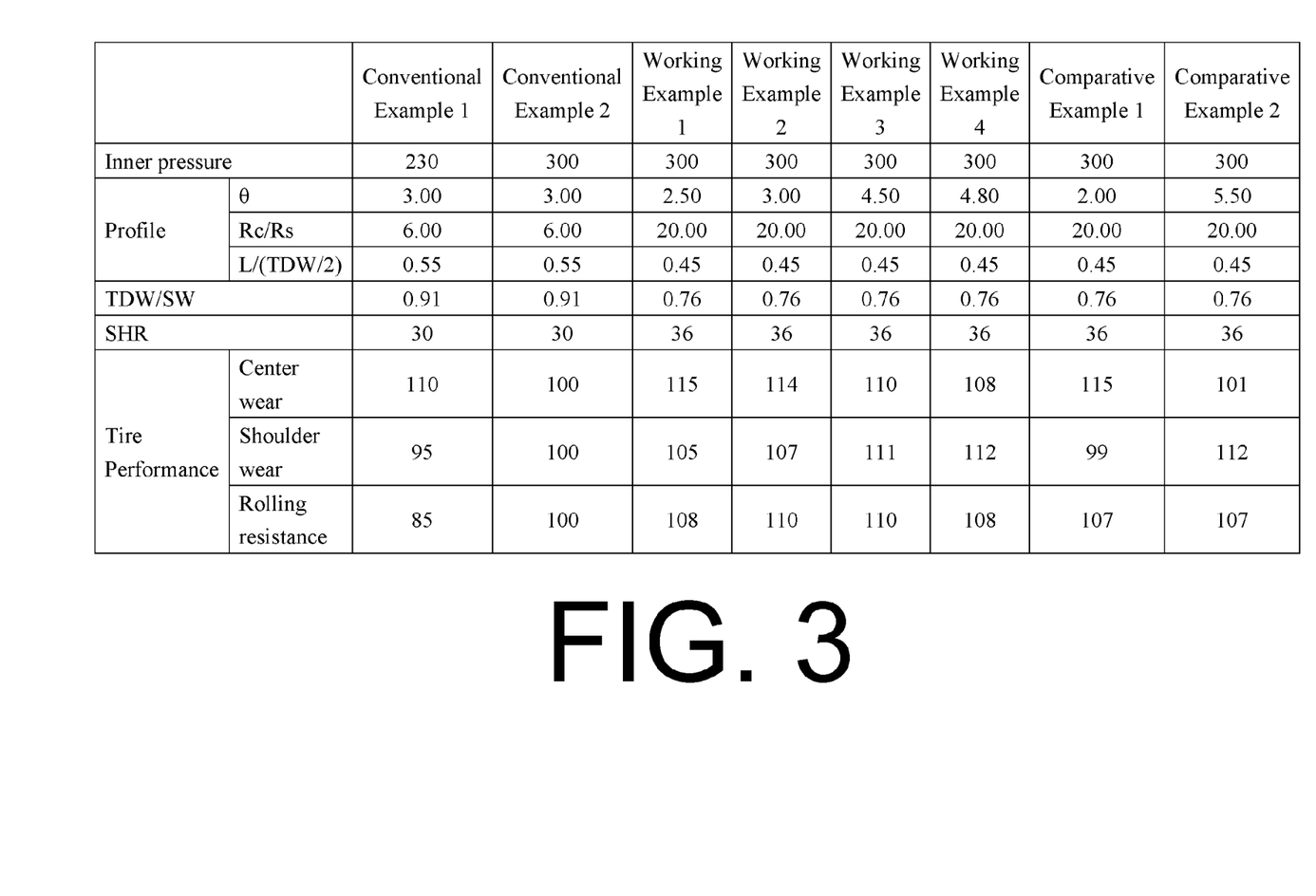
FIG. 3 is a table showing results of performance testing of pneumatic tires according to examples of the present technology.

In FIG. 3, the pneumatic tires of Working Examples 1 to 4 were inflated to an inner pressure of 300 kPa, and the profiles of the tread surfaces and tread patterns thereof were within stipulated ranges. On the other hand, in contrast to the pneumatic tires of Working Examples 1 to 4, those of Comparative Examples 1 and 2 had a θ of the profiles of the tread surfaces that was outside the stipulated range.

Figure 4:
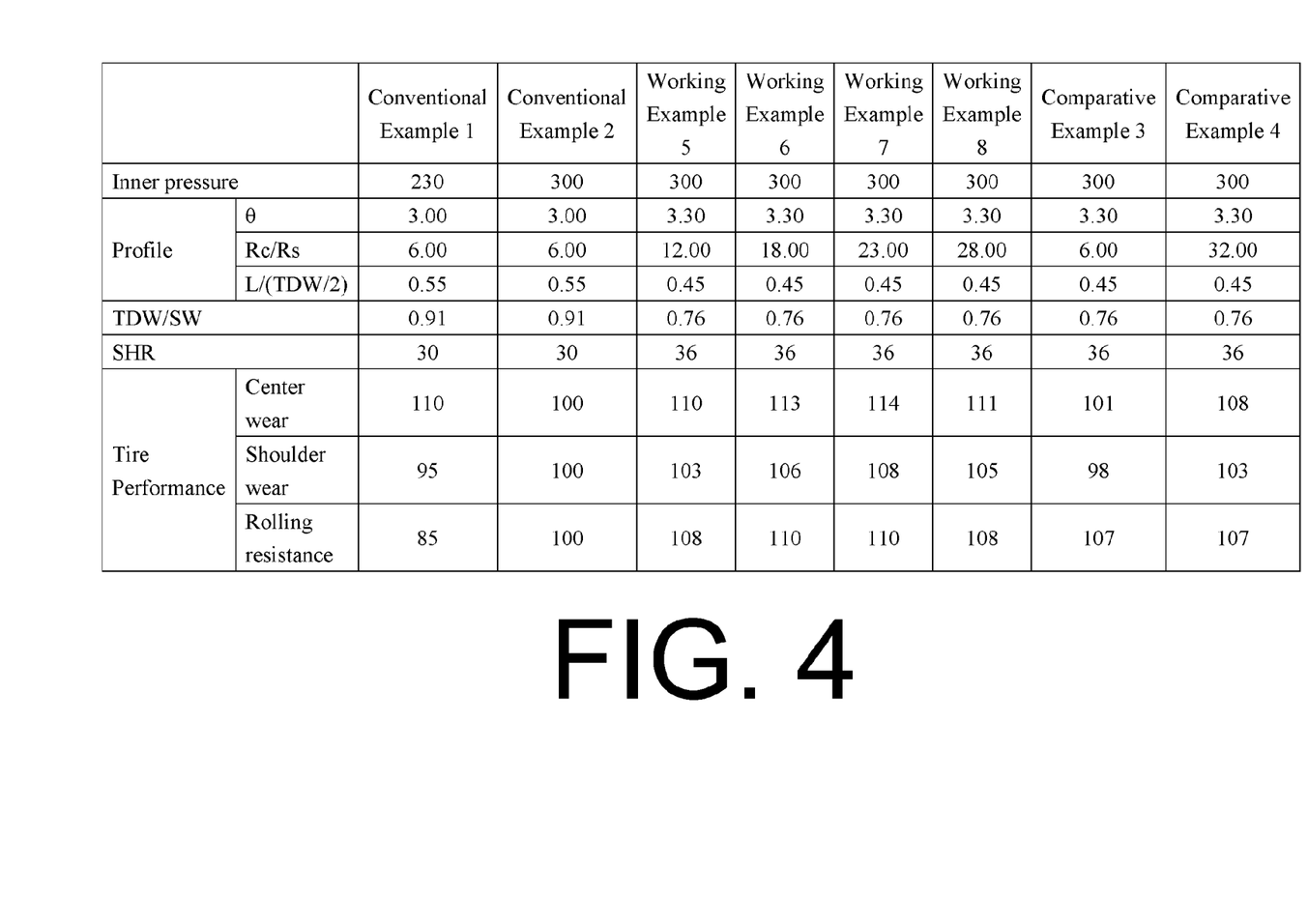
FIG. 4 is a table showing results of performance testing of pneumatic tires according to examples of the present technology.

In FIG. 4, the pneumatic tires of Working Examples 5 to 8 were inflated to an inner pressure of 300 kPa, and the profiles of the tread surfaces and tread patterns thereof were within stipulated ranges. On the other hand, in contrast to the pneumatic tires of Working Examples 5 to 8, those of Comparative Examples 3 and 4 had an Rc/Rs of the profiles of the tread surfaces that was outside the stipulated range.

Figure 5:
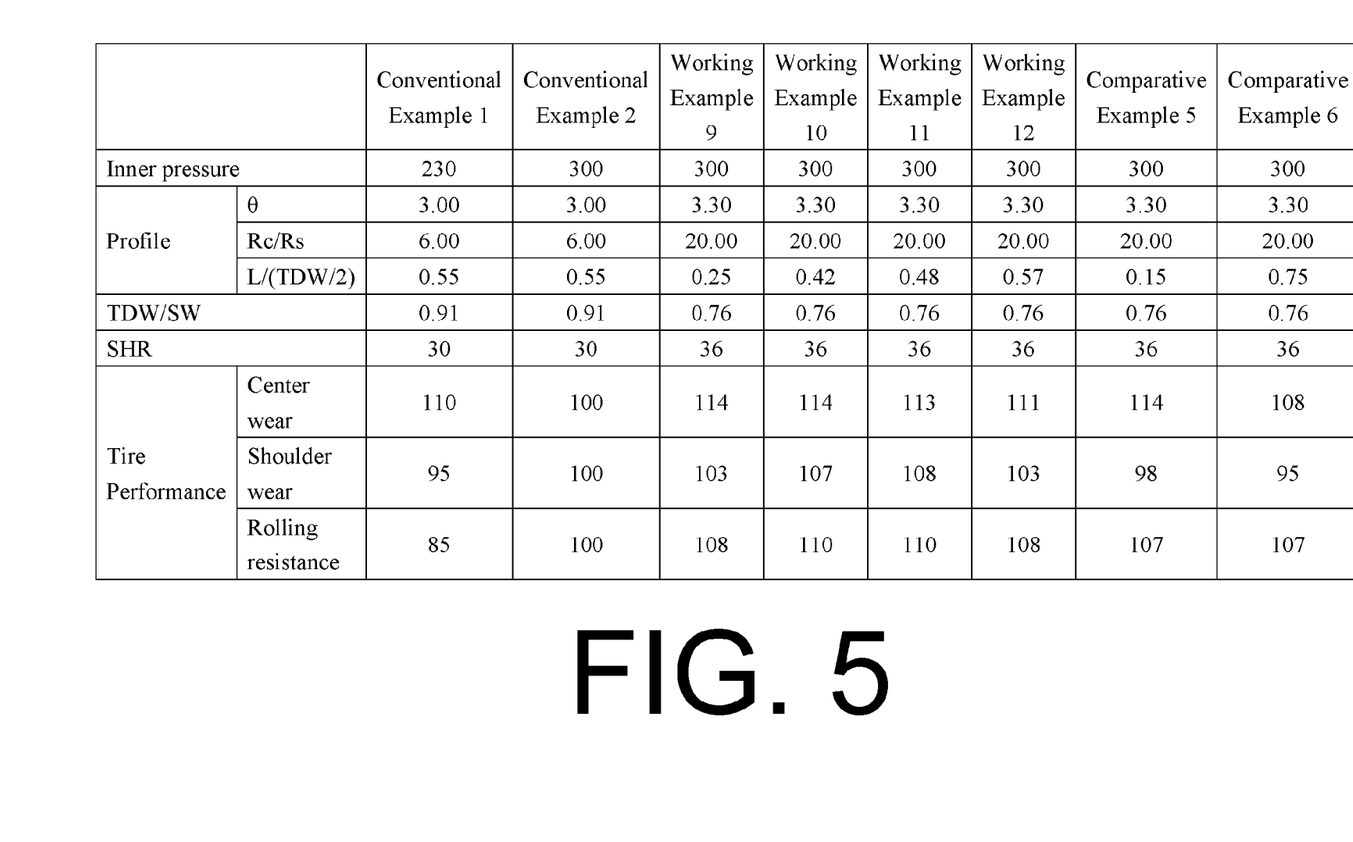
FIG. 5 is a table showing results of performance testing of pneumatic tires according to examples of the present technology.

In FIG. 5, the pneumatic tires of Working Examples 9 to 12 were inflated to an inner pressure of 300 kPa, and the profiles of the tread surfaces and tread patterns thereof were within stipulated ranges. On the other hand, in contrast to the pneumatic tires of Working Examples 9 to 12, those of Comparative Examples 5 and 6 had a L/(TDW/2) of the profiles of the tread surfaces that was outside the stipulated range.

Figure 6:
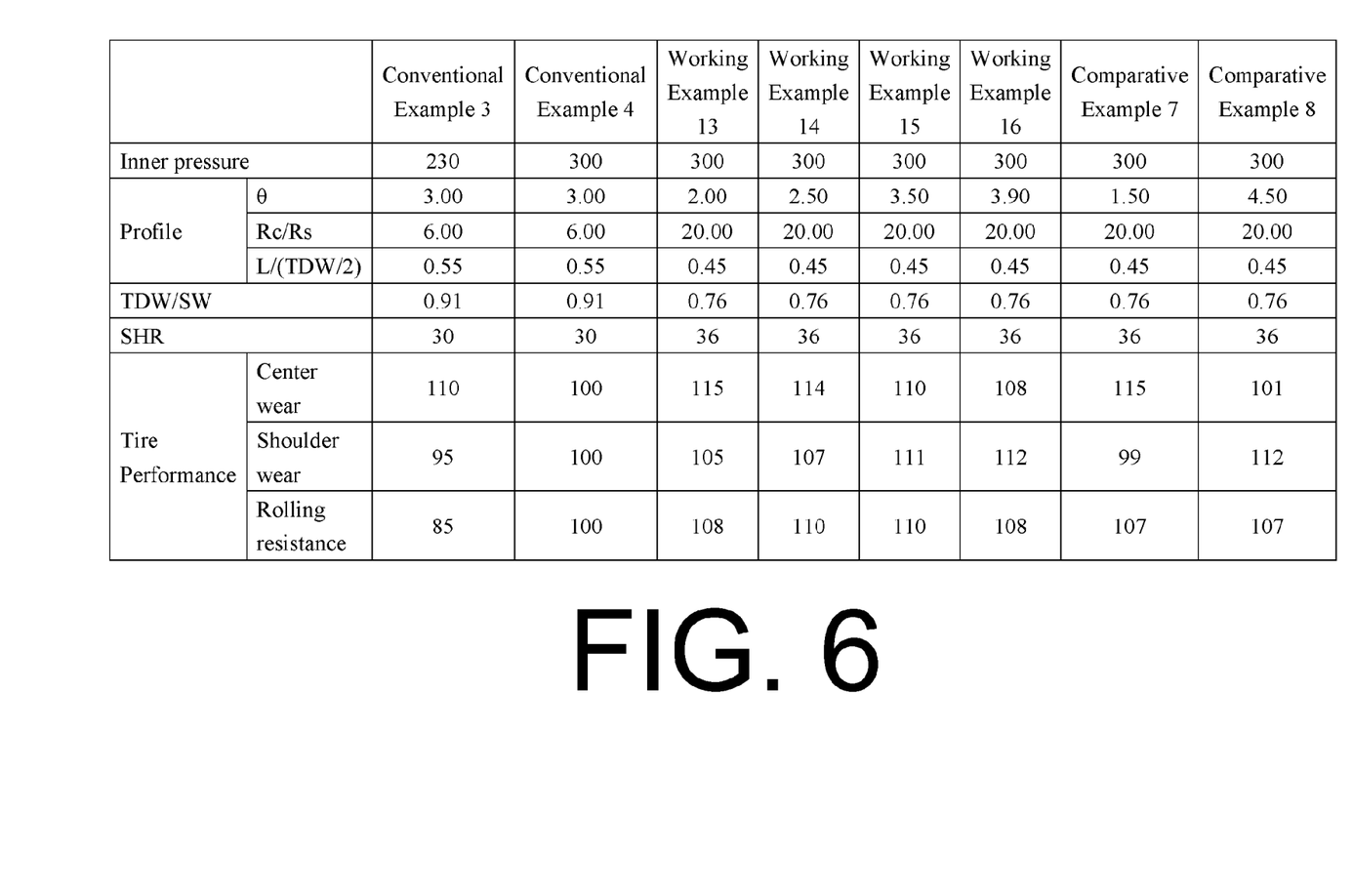
FIG. 6 is a table showing results of performance testing of pneumatic tires according to examples of the present technology.

In FIG. 6, the pneumatic tires of Working Examples 13 to 16 were inflated to an inner pressure of 300 kPa, and the profiles of the tread surfaces and tread patterns thereof were within stipulated ranges. On the other hand, in contrast to the pneumatic tires of Working Examples 13 to 16, those of Comparative Examples 7 and 8 had a θ of the profiles of the tread surfaces that was outside the stipulated range.

Figure 7:
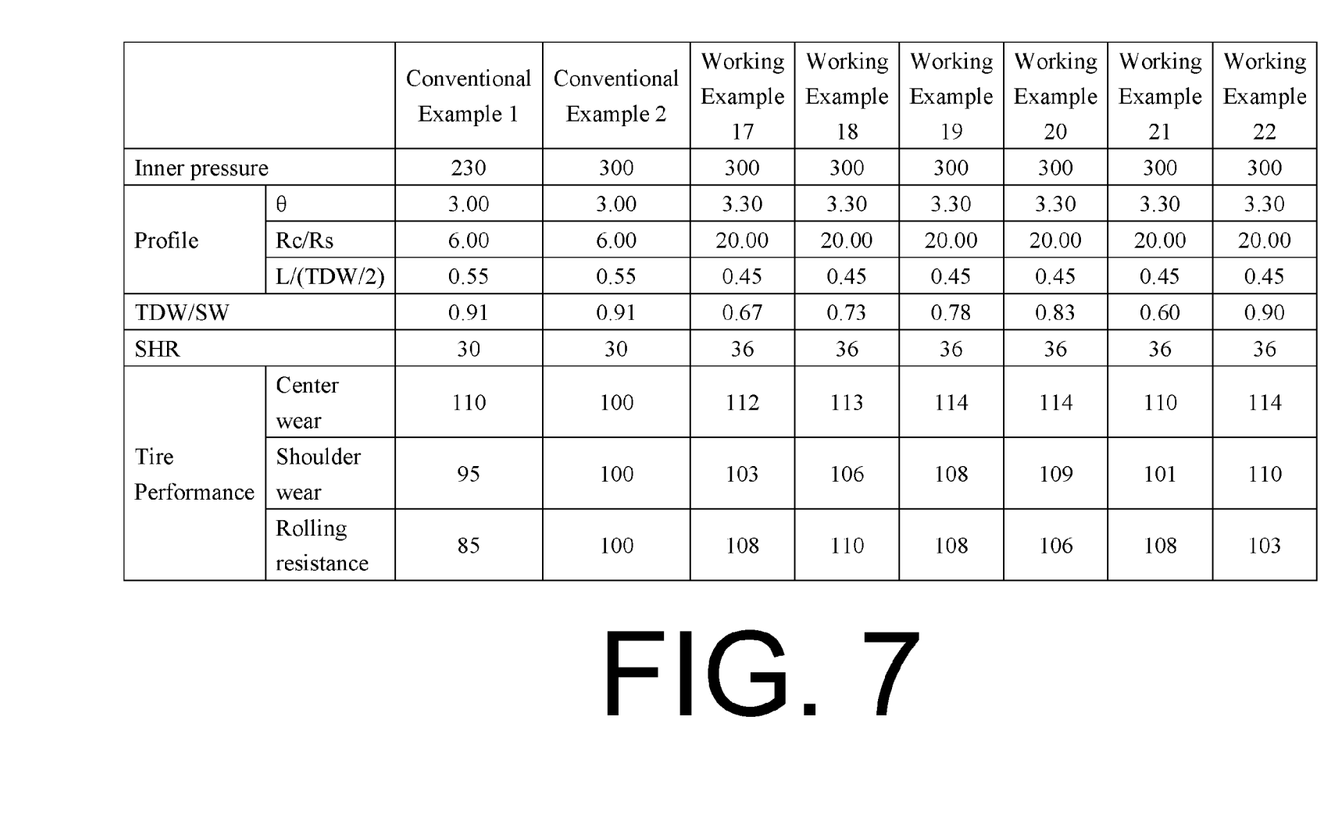
FIG. 7 is a table showing results of performance testing of pneumatic tires according to examples of the present technology.

In FIG. 7, the pneumatic tires of Working Examples 17 to 20 were inflated to an inner pressure of 300 kPa, and the profiles of the tread surfaces and tread patterns thereof were within stipulated ranges. On the other hand, in contrast to the pneumatic tires of Working Examples 17 to 20, those of Working Examples 21 and 22 had a TDW/SW, which is the relationship between the developed tread width TDW and the tire cross-sectional width SW (length at a position of greatest width in the tire width direction) that was outside the stipulated preferable range.

Figure 8:
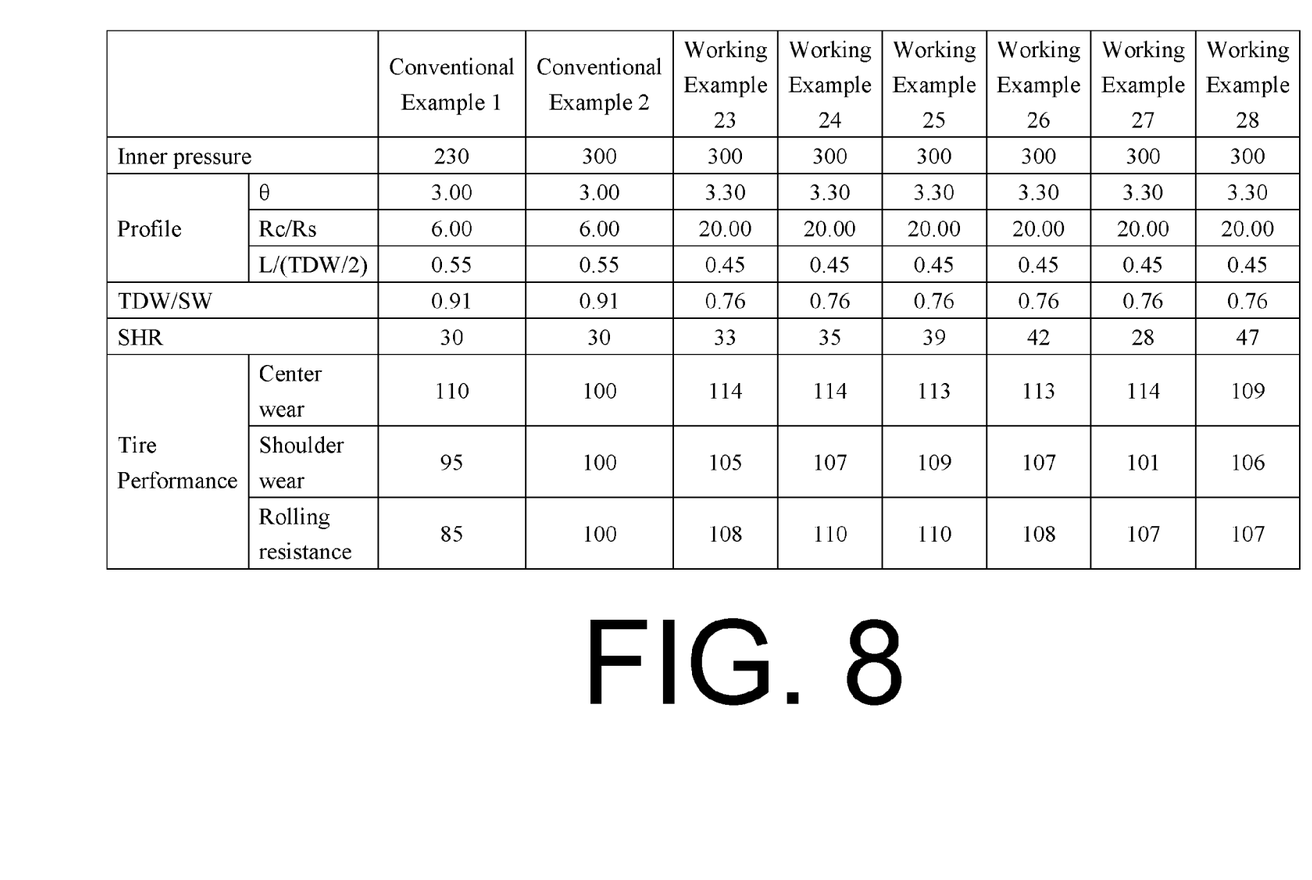
FIG. 8 is a table showing results of performance testing of pneumatic tires according to examples of the present technology.

In FIG. 8, the pneumatic tires of Working Examples 23 to 26 were inflated to an inner pressure of 300 kPa, and the profiles of the tread surfaces and tread patterns thereof were within stipulated ranges. On the other hand, in contrast to the pneumatic tires of Working Examples 23 to 26, those of Working Examples 27 and 28 had a curvature radius SHR of an arc having a first edge in contact with the shoulder side arc and a second edge in contact with the side portion arc on the outermost side in the tire width direction of the tread portion that was outside the stipulated preferable range.

As shown in the test results in FIGS. 3 to 8, it is clear that the pneumatic tires of Working Examples 1 to 28 each had reduced rolling resistance and each showed improvements in wear resistance of the center region of the tread surface and wear resistance of the shoulder region of the tread surface.

As described above, the pneumatic tire according to the present technology is suitable for use as a pneumatic tire mounted on a vehicle.

What is claimed is:

1. A pneumatic tire comprising a plurality of arcs having different curvature radii in a tread surface of a tread portion, including at least a center portion arc positioned in a center in a tire width direction and a shoulder side arc connected to an outer side in the tire width direction of the center portion arc, wherein when
a cross-section in a tire meridian direction is viewed in a state where the pneumatic tire is assembled on a regular rim and is inflated to an inner pressure that is 5% of a regular inner pressure;
an intersection of an imaginary extended line of the shoulder side arc and an imaginary extended line of a side portion arc on an outermost side in the tire width direction in the tread portion is a reference point;
an intersection of a tire equatorial plane and a profile of the tread surface is a center crown;
an angle formed by a straight line joining the reference point and the center crown and a straight line parallel to the tire width direction and passing through the center crown is θ;
a curvature radius of a center portion arc is Rc;
a curvature radius of a shoulder side arc is Rs;
a reference developed width that is an arc length from the tire equatorial plane to a position at an edge of the shoulder side arc on the tire width direction inner side is L;
a developed tread width that is an arc length in the tire width direction between points where a reference line that passes through the reference point and is parallel to the tire equatorial plane intersects the tread surface is TDW; and
an aspect ratio is β,
the tread surface is formed so as to satisfy $$0.025 \times \beta + 1.0 \leq \theta \leq 0.045 \times \beta + 2.5$$

$$15 \leq Rc/Rs \leq 25 \text{ and}$$

$$0.2 \leq L/(TDW/2) \leq 0.7.$$

2. The pneumatic tire according to claim 1, wherein when a tire cross-sectional width that is a length at a position of greatest width in the tire width direction is SW, the profile is formed so as to satisfy $$0.65 \leq TDW/SW \leq 0.85.$$

3. The pneumatic tire according to claim 1, wherein the pneumatic tire is a high internal-pressure pneumatic tire for use on a passenger car.

4. The pneumatic tire according to claim 3, wherein the pneumatic tire is configured to support a high internal-pressure that is not less than 280 kPa and not more than 350 kPa.

5. The pneumatic tire according to claim 1, wherein when a tire cross-sectional width that is a length at a position of greatest width in the tire width direction is SW, the profile is formed so as to satisfy $$0.70 \leq TDW/SW \leq 0.80.$$

6. The pneumatic tire according to claim 1, wherein the tread surface is formed so as to satisfy $0.03 \times \beta + 1.2 \leq \theta \leq 0.04 \times \beta + 2.3$.

7. A pneumatic tire comprising a plurality of arcs having different curvature radii in a tread surface of a tread portion, including at least a center portion arc positioned in a center in a tire width direction and a shoulder side arc connected to an outer side in the tire width direction of the center portion arc, wherein when
- a cross-section in a tire meridian direction is viewed in a state where the pneumatic tire is assembled on a regular rim and is inflated to an inner pressure that is 5% of a regular inner pressure;
- an intersection of an imaginary extended line of the shoulder side arc and an imaginary extended line of a side portion arc on an outermost side in the tire width direction in the tread portion is a reference point;
- an intersection of a tire equatorial plane and a profile of the tread surface is a center crown;
- an angle formed by a straight line joining the reference point and the center crown and a straight line parallel to the tire width direction and passing through the center crown is A;
- a curvature radius of a center portion arc is Rc;
- a curvature radius of a shoulder side arc is Rs;
- a reference developed width that is an arc length from the tire equatorial plane to a position at an edge of the shoulder side arc on the tire width direction inner side is L;
- a developed tread width that is an arc length in the tire width direction between points where a reference line that passes through the reference point and is parallel to the tire equatorial plane intersects the tread surface is TDW; and
- an aspect ratio is β, the tread surface is formed so as to satisfy $$0.025 \times \beta + 1.0 \leq \theta \leq 0.045 \times \beta + 2.5$$

$$12 \leq Rc/Rs \leq 30 \text{ and}$$

$$0.4 \leq L/(TDW/2) \leq 0.5.$$

* * * * *